2,865,795
Patented Dec. 23, 1958

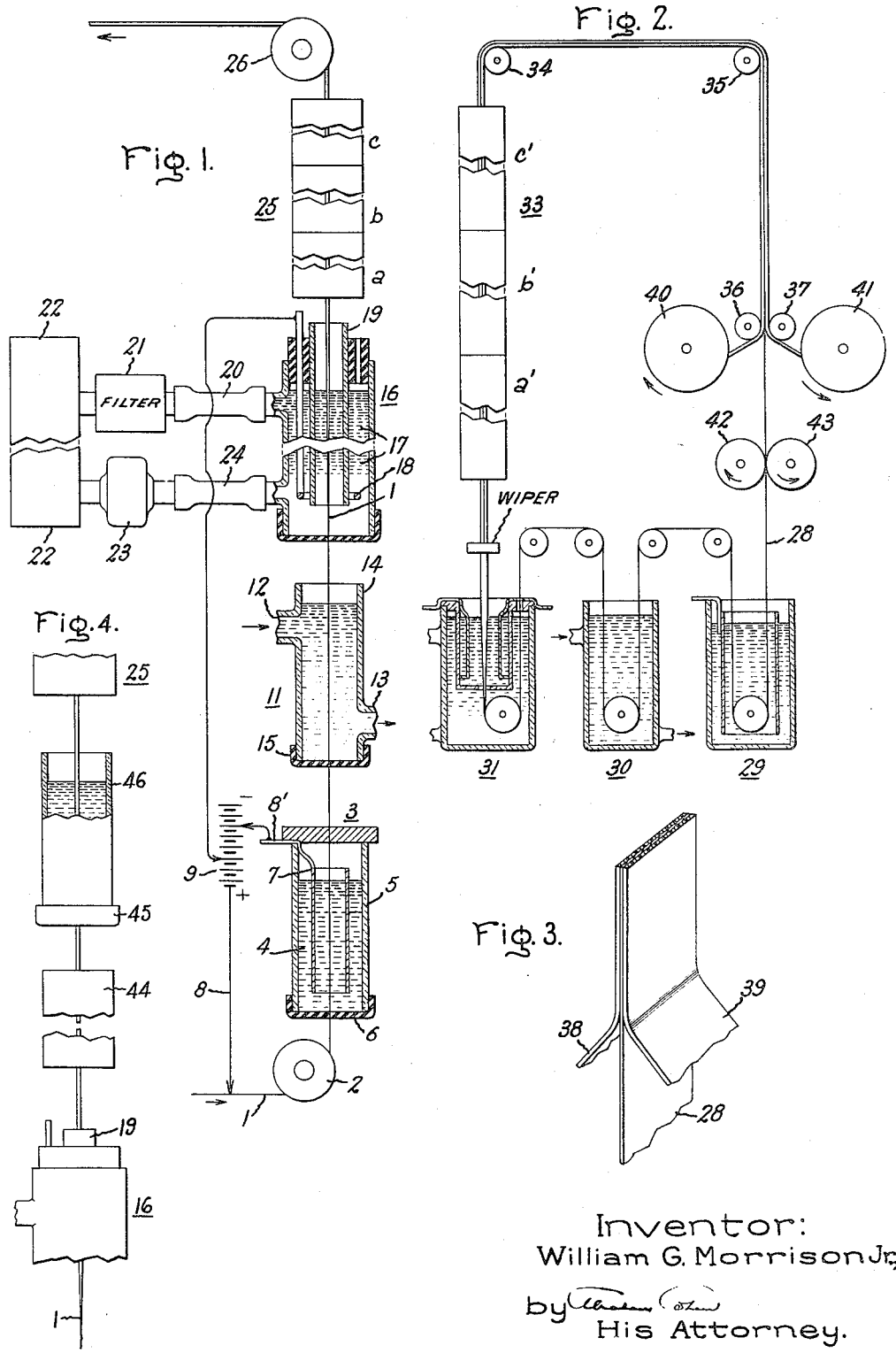

2,865,795

INSULATED ELECTRICAL CONDUCTOR AND METHOD OF MAKING THE SAME

William G. Morrison, Jr., Schenectady, N. Y., assignor to General Electric Company, a corporation of New York Application October 30, 1951, Serial No. 253,832

8 Claims. (Cl. 117—230)

The present invention comprises improved compositions of synthetic resinous materials and a method for applying such compositions as homogeneous coatings on the surfaces of metallic conductors.

It is one of the objects of the invention to provide electrical conductors with insulating coatings which are of adequate thickness and well adapted for direct application to the surface of metal conductors. Another object of my invention is to provide improved insulating coatings of organic compositions which are capable of withstanding without damage elevated temperatures up to several hundred degrees centigrade. These objects are attained by blending emulsified compositions of solid polyhalogenated ethylene with compositions of organo polysiloxane resins as will be explained hereafter in greater detail.

Insulating coatings on conductors consisting of polymerized tetrafluoroethylene alone are capable of withstanding high temperatures. However, coatings of this material when thicker than about one mil will form cracks and checks when the suspending liquid is removed from the wet coatings. As coatings of greater thickness than one mil are required for various insulating and coating purposes, the utilization of heat-resistant polymerized tetrafluoroethylene for deposition as insulation from dispersions of such polymer heretofore has been restricted.

I have discovered that when an aqueous dispersion of polymerized tetrafluoroethylene and an aqueous dispersion of a heat-resisting plasticizing resin and in particular an organopolysiloxane resin are blended in proportions hereafter specified and applied as coatings on metal surfaces in thicker layers than is practicable for the application of such polytetrafluoroethylene compound alone, that such thicker coating can be dried and baked without cracking or other physical damage and will have excellent insulating characteristics. In view of the fact that polymerized tetrafluoroethylene (known commercially as Teflon) is insoluble in ordinary solvents, the blending of organopolysiloxane resins or silicone resins therewith cannot be carried out by solution in a common solvent.

In carrying out my invention these two otherwise incompatible materials are associated or mixed as dispersions or emulsions in water. The resulting compositions are deposited electrically on conductors, that is by electrophoresis. For convenience and brevity the organopolysiloxane resinous compositions hereinafter referred to and described will be identified as "silicone resins." In accordance with generally accepted usage, the latter expression is intended to refer to silicone materials which are cured, i. e., polymerized, to form hard, solid materials, as distinguished from other silicones, such as silicone oils, which are not hardenable by heat curing and are fluid, oily or greasy over a wide range of temperatures.

The accompanying drawing Fig. 1 illustrates conventionally an apparatus for coating wire with insulation embodying the present invention; Fig. 2 illustrates conventionally a modification which is suitable particularly for the production of insulating tape; Fig. 3 is a fragmental view showing in perspective and on a larger scale a modification involving the separation of tape-like products from a ribbon-shaped electrode; and Fig. 4 illustrates a modified coating apparatus.

Aqueous dispersions of polytetrafluoroethylene, which are sold by E. I. du Pont de Nemours & Co. as Teflon Wire Enamel (852–001), and which are obtainable in the open market, are suitable for admixture or blending with aqueous dispersions of silicone resins for coating purposes in accordance with my invention. Such aqueous dispersions may contain about sixty percent solids. The preparation of such dispersions is described in U. S. Patent 2,478,229—Berry.

The silicone resins herein employed may be prepared by methods described in Rochow U. S. Patents 2,258,218–222, issued October 7, 1941, and in Welsh U. S. Patent 2,449,572 patented September 21, 1948. As described in these patents and as is well understood, organohalogenosilanes, for example, methyl and phenyl chlorosilanes, either alone or combined, are hydrolyzed. The compositions formed as a result of the hydrolysis can be used to make various useful products, including resinous and rubber-like products, depending on the organohalogenosilane or mixture of organohalogenosilanes used. The hydrocarbon radicals attached to the silicon atoms in either the organohalogenosilane or organopolysiloxanes prepared therefrom may be a hydrocarbon radical selected from a group consisting of alkyl, aryl, alkaryl and aralkyl radicals. Various organopolysiloxane compositions containing different silicon-bonded hydrocarbon radicals, e. g., alkyl, aryl, alkaryl, and aralkyl radicals described in the preceding patents may be prepared and used for the present purposes to obtain desired properties of the ultimate coating composition. Hydrocarbon-to-silicon ratios from 1 to less than 2, e. g., from 1·2 to 1·8 are generally employed.

A composition which I have found eminently suitable for association with the polytetrafluoroethylene comprises and emulsion in water of methyl-phenyl-polysiloxane resin containing an average of about 1.6 total methyl and phenyl groups per silicon atom. Such an organopolysiloxane resin is obtained by cohydrolyzing with water a mixture of hydrocarbon-substituted chlorosilanes consisting of methyltrichlorosilane, dimethyldichlorosilane, diphenyldichlorosilane and phenyltrichlorosilane. The resin obtained by cohydrolysis of such mixture of silanes preferably is bodied to a higher viscosity and dissolved in a solvent such as, xylene, toluene, etc. The solution may contain about 60 percent resin solids, by weight. The emulsion may also contain from about 0.5 to 4 percent, e. g., 2 percent, by weight (based on the weight of the resin) of a silicone resin cure accelerator, for instance, a metallic salt of an organic acid, for example, zinc octoate, as is more particularly disclosed and claimed in the aforementioned Welsh patent. Approximately equal parts of this resin solution and water are formed into an emulsion. Emulsification may be caused by using a colloid mill and an emulsifying agent, say about 5 percent based on the weight of the resin solution. As emulsifying agent may be used a condensation product of polyethylene glycol with alkyl, or aryl or alkyl and aryl acids or alcohols. Other emulsifying agents may be used, for example, stearamine acetate, morpholine oleate, and sorbitan monolaurate polyalkylene derivatives.

Emulsions of polymerized tetrafluoroethylene and other polymerized organic compounds which are heat-resisting may be used for electrophoretic deposition for the purposes of my invention. For example, such emulsions may contain monochlortrifluoroethylene.

Mixtures of aqueous dispersions of polytetrafluoroethylene and silicone resins in proportions within a range of about 10 to 20 percent silicone resin solids and 90 to 80 percent polytetrafluoroethylene solids are suitable for use as aqueous base compositions for the purposes of my invention. For best results, compositions are used consisting, by weight, of 85 to 80 percent polytetrafluoroethylene solids and about 15 to 20 percent silicone resin solids, which preferably consist of the above-mentioned cohydrolysis product. When the proportion of silicone resin is increased well above 20%, say to 25 or 30% silicone content, then difficulties are experienced in the removal of the volatile matter. Even with 25% silicone content some blister formation occurs during the baking step. Although the amount of aqueous suspending medium may be varied, ordinarily about 60%, by weight, of the aqueous emulsion should consist of water.

Referring to Fig. 1 a conductor 1, such as bare copper wire or aluminum wire, to be coated, upon being unreeled from a spindle 2, passes successively through a series of stations. The first station 3 comprises an electrolytic cleaning bath 4 in a container 5, the wire passing through a small opening in a rubber bottom closure 6. The cleaning station contains a cathode 7, the conductor to be coated constituting the anode 1. The electrolyte 4 in the container 5 may assume various known cleaning compositions. An aqueous solution of phosphoric acid is suitable. The anode 1 and the cathode 7 are connected by the conductors 8, 8' to a source of direct current, represented by a battery 9. The cleaning station 3 removes oxide and surface impurities.

The conductor 1 passes from the cleaning station 3 to a rinsing station 11, which receives fresh water through an inlet 12 and discharges wash water through an outlet 13. The bottom of the container 14 is closed also by a perforated rubber cap 15 through the orifice of which the wire is threaded.

The cleaned conductor next passes to an electrodeposition station, namely an electrolytic cell 16 in which by electrophoresis a desired mixture of polytetrafluoroethylene and silicone resin dispersions in water is deposited on the conductor 1 from the aqueous dispersion mixture 17 in the cell 16. The addition of enough phosphoric acid to the composition prevents the bath from becoming too basic due to electrolytic action and also precipitates undesired copper ions in the bath. The conductor 1 constitutes the anode of this cell. The vertically adjustable ring-shaped cathode 18 may consist of copper or other suitable metal.

A cylinder 19 of non-conductive material surrounds the upper part of the anode to prevent a froth generated by the bubbles evolved at the cathode from spreading over the surface of the liquid and undesirably adhering to the deposit on the wire being coated. The cathode may be moved relative to the lower end of the cylinder 19 to adjust the thickness of the deposit. The current density may be adjusted also to vary the thickness of the deposit. Circulation of the electrolyte from the cell 16 through the conduit 20 and filter 21 into a reservoir 22 and back from the reservoir through a pump 23 and a conduit 24 maintains homogeneity and removes undesired agglomerated particles from the electrolyte. Although the thickness of the coatings may be varied over a wide range, usually satisfactory results are limited to a maximum thickness of about 5 mils. The current densities may range from 50 ma. per square inch to one ampere per square inch or slightly greater.

The baking station to which the coated wire travels is an oven or a chain of ovens as indicated at 25. These ovens operate at progresssively higher temperatures. In the early stage of baking entrained dispersion water and whatever solvent was associated with the polysiloxanes and other volatiles are evaporated from the coatings. The first zone $a$ of the oven 25 may operate at a temperature in the range of about 80° to 140° C. The next zone $b$ of the oven may operate in the range of about 150° to 300° C. and the oven zone $c$ last to be reached may operate at about 400° C. At the maximum final baking temperatures the polytetrafluoroethylene is fused and a firm homogeneous coating results. The coated wire leaves the oven over a guide roll 26 to be suitably collected on a spindle or other device (not shown). The coated wire may be operated in electrical apparatus at elevated temperatures, for example at about 200° C. or even higher, without any deterioration of the composite insulation of silicone resin and polytetrafluoroethylene.

The silicone resin associated with the polytetrafluoroethylene makes it practicable to obtain sound coatings, materially thicker than one mil, which are free from cracks or other defects. As indicated above, such coatings contain a predominant amount of polytetrafluoroethylene combined with a sufficient amount of the silicone resin to prevent formation of cracks in the coating. The coatings have a short time dielectric strength between about 2000 to 3000 volts per mil at ordinary temperatures. Satisfactory deposits can be made on a base of iron, and some of its alloys (such as silicon steel) as well as on copper.

The apparatus of Fig. 2 is adapted particularly for the deposition of blends of polymerized tetrafluoroethylene and polysiloxanes from aqueous suspensions on ribbon-shaped foundations from which the deposits are stripped to form insulating tapes.

A flat ribbon electrode 28 (Figs. 2 and 3) passes successively through a cleaning station 29, a washing station 30, and an electro-deposition station 31 which are similar to the corresponding stations heretofore described in connection with Fig. 1.

The coated ribbon electrode emerging from the electro-deposition station 31 first has the deposit removed from the edges of the ribbon by a wiper conventionally indicated at 32 and then passes through a series of sections $a'$, $b'$ and $c'$ of an oven 33 which operate at successively higher temperatures as previously described in connection with the apparatus shown in Fig. 1. The ribbon then passes over guide rollers 34, 35 to separating rollers 36, 37 whereby the flat ribbon-shaped deposits 38, 39 (Fig. 3) on the conductor 28 are stripped away from the metal base and collected upon spools 40, 41.

The ribbon 28 after being freed from the polytetrafluoroethylene-silicone deposit passes between powered rollers 42, 43 back into the cleaning station 29 and again to the other stations where the described cycle is repeated. The discoloration on sides of the films which were in contact with the metal electrode 28 may be removed by treatment with hydrochloric or other suitable acid.

Ribbon or tape material embodying my invention may be used in the electrical field for various insulating and dielectric purposes. For example, such ribbon may be applied by winding on bare conductors, or as wrapping tape in the production of coils or windings of conductors coated with enamel or other insulation. Material made as described in connection with Figs. 2 and 3 may be used as the dielectric element in the fabrication of electric capacitors.

In some cases when coils or windings consisting of electric conductors which are provided with coatings made as herein described are treated or impregnated with conventional insulating materials, it is found that the impregnating materials do not readily wet or unite with the surface of such conductors. In accordance with a modification of my invention, insulating coatings on conductors comprising a major proportion of polytetrafluoroethylene are provided with an external layer of organopolysiloxane resin such as herein described and termed silicone resin. The external layer of silicone resin improves the surface compatibility of such conductors with respect to conventional insulating materials.

For this purpose, the coating apparatus may be modified as shown in Fig. 4. As shown in this figure, a conductor 1 when emerging from the electrophoretic cell 16 coated with the above-described composition polymerized tetrafluoroethylene and silicone resin instead of passing directly into the ovens 25 is given a preliminary baking in a drying oven 44 which operates at a temperature of about 100° C. in order to eliminate volatile material and to cause preliminary solidification of the soft deposit formed in the cell 16 without, however, fusing or completely heat-converting the coating. From the drying oven 16, the coated wire passes through an opening in a suitable yieldable diaphragm 45 into a container 46 containing a solution of chosen silicone resin in a suitable solvent, for example, toluene, whereby the partially hardened coating becomes coated with a thin surface skin of the silicone resin. The coated conductor then passes on to the chain of higher temperature ovens 25 which were described in connection with Fig. 1.

Although silicone resins do not adhere to the coating of polytetrafluoroethylene and silicone if applied after heat-treatment at a temperature high enough to cause fusion, good adhesion is realized when the silicone is applied to the coating prior to fusion of the polytetrafluoroethylene.

The external layer of silicone resin on the wire results in sufficient surface wettability to permit impregnation with liquid insulating compositions by conventional processes particularly by silicone products.

Conductors insulated with compositions of polyfluoroethylene and organopolysiloxane resins may be used as magnet wire and particularly for electrical purposes requiring insulated wire to withstand heat which would damage conventional organic insulation. Coatings made in accordance with my invention may be applied on the frames and stacked punchings of rotors, stators and other metallic parts. In tape form products embodying this invention may be used for wrapping purposes in the electrical field and as dielectric films for capacitors.

What I claim as new and desire to secure by Letters Patent of the United States is:

1. An insulating composition consisting by weight substantially of about 80 to 90 percent of polymeric tetrafluoroethylene and 20 to 10 percent of a cure-hardenable organopolysiloxane resin.

2. Electric insulation consisting of an intimate mixture by weight of substantially of about 85 percent of polymeric tetrafluoroethylene and of about 15 percent of a heat-hardenable organopolysiloxane resin.

3. An electric conductor and an adherent, homogeneous coating thereon consisting of a blend of polymerized tetrafluoroethylene and a cure-hardened organopolysiloxane resin, said coating being thicker than 1 mil and containing a predominant amount of the polymerized tetrafluoroethylene and a sufficient amount of the organotetrafluoroethylene and a sufficient amount of the organopolysiloxane resin to prevent formation of cracks in the coating.

4. An electric conductor, an adherent homogeneous coating thereon consisting by weight of about 80 to 85 parts of polytetrafluoroethylene and about 20 to 15 parts of heat-hardened organopolysiloxane resin and an overlying coating of heat-hardened organopolysiloxane resin.

5. An electric conductor and an adherent homogeneous coating thereon having a thickness of about 5 mils and consisting, by weight, of about 80 to 85 parts polymerized tetrafluoroethylene in intimate mixture with about 20 to 15 parts of a heat-hardened methyl and phenyl polysiloxane resin.

6. Electric insulation in sheet form comprising by weight substantially about 80 to 90 percent of polymeric tetrafluoroethylene in intimate mixture with about 20 to 10 percent of a heat-hardened organopolysiloxane resin.

7. The method of applying on a conductor an adherent homogeneous electrically insulating coating comprising as main ingredients polymerized tetrafluoroethylene and a hydrocarbon-substituted polysiloxane which comprises mixing aqueous dispersions of said ingredients in chosen proportions, said polymerized tetrafluoroethylene being in predominant amount and said polysiloxane being in sufficient amount to prevent formation of cracks in the coating, applying said ingredients upon the uncoated metal surface of a conductor by electrophoresis of said aqueous dispersion to provide a coating thicker than 1 mil, and baking the resulting deposition in a heated zone operating at temperatures increasing progressively from a temperature of about 80° to 140° C. to eliminate the liquid phase of said dispersion to a more elevated temperature at which fusion and coalescence of said ingredients occurs.

8. The process of making electrical insulation sheet material, comprising coating the metal surface of an electrical conductor with a mixture of polytetrafluoroethylene and a polymerized phenyl-methyl siloxane product by electrophoresis from an aqueous suspension of said substances in suitable proportion, said polytetrafluoroethylene being in predominant amount and said siloxane product being in a sufficient amount to prevent formation of cracks in the coating, said coating being thicker than 1 mil, heating the resulting coating to temperatures sufficiently high to cause elimination of vaporizable components and heat curing of deposited solid material, and stripping the heat-cured product from said conductor.

References Cited in the file of this patent

UNITED STATES PATENTS

| | | |
|---|---|---|
| 1,590,603 | Taylor | June 29, 1926 |
| 1,887,678 | Gardner | Nov. 15, 1932 |
| 2,042,923 | Brooks | June 2, 1936 |
| 2,085,995 | Patnode | July 6, 1937 |
| 2,093,501 | Williams | Sept. 1, 1937 |
| 2,119,727 | Talbot | June 7, 1938 |
| 2,345,013 | Soday | Mar. 28, 1944 |
| 2,393,068 | Ruben | Jan. 15, 1946 |
| 2,459,653 | Keyes | Jan. 18, 1949 |
| 2,478,322 | Robinson et al. | Aug. 9, 1949 |
| 2,495,630 | Dorst | Jan. 24, 1950 |
| 2,530,366 | Gray | Nov. 21, 1950 |
| 2,578,523 | Llewellyn | Dec. 11, 1951 |
| 2,644,802 | Lontz | July 7, 1953 |
| 2,710,290 | Safford et al. | June 7, 1955 |
| 2,719,833 | Vincent et al. | Oct. 4, 1955 |

UNITED STATES PATENT OFFICE
CERTIFICATE OF CORRECTION

Patent No. 2,865,795

December 23, 1958

William G. Morrison, Jr.

It is hereby certified that error appears in the printed specification of the above numbered patent requiring correction and that the said Letters Patent should read as corrected below.

Column 2, line 39, for "and" read -- an --; column 5, line 50, strike out "tetrafluoroethylene and a sufficient amount of the organ-".

Signed and sealed this 24th day of March 1959.

(SEAL)
Attest:

KARL H. AXLINE
Attesting Officer

ROBERT C. WATSON
Commissioner of Patents